(No Model.)
T. A. WEBER.
METHOD OF AND APPARATUS FOR MANUFACTURING CORK BOARD.
No. 524,746. Patented Aug. 21, 1894.
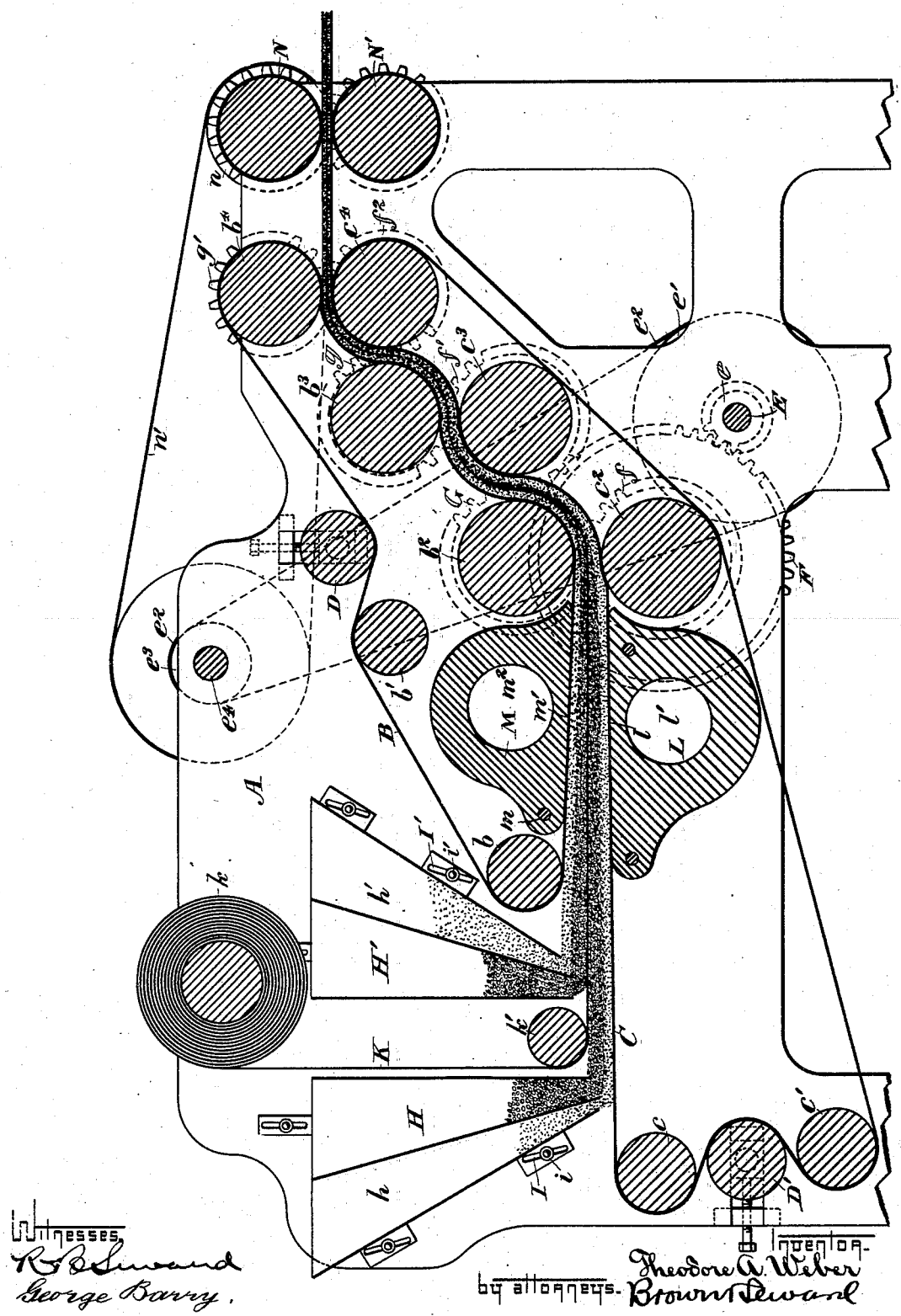

UNITED STATES PATENT OFFICE.

THEODORE A. WEBER, OF NEW YORK, N. Y., ASSIGNOR TO HORACE JONES AND FREDERICK W. EDDY, OF SAME PLACE.

METHOD OF AND APPARATUS FOR MANUFACTURING CORK-BOARD.

SPECIFICATION forming part of Letters Patent No. 524,746, dated August 21, 1894.

Application filed November 20, 1893. Serial No. 491,388. (No model.)

*To all whom it may concern:*

Be it known that I, THEODORE A. WEBER, of New York, in the county and State of New York, have invented a new and useful Improvement in Methods of and Apparatus for Manufacturing Cork-Board, of which the following is a specification.

My invention relates to an improvement in the method of and apparatus for manufacturing cork-board in which a concealed web of some suitable fibrous material is provided upon its opposite sides with granules of cork compressed into a tough, flexible, coherent sheet.

My invention consists in feeding continuously forward a web of some suitable fibrous material prepared with an adhesive substance and, simultaneously with the advance movement of the web, feeding granules of cork to the opposite sides of the web, heating the layers of cork and web and finally pressing the layers of cork and interposed web into a compact sheet.

My invention further consists in the apparatus for carrying into effect the method above stated.

In the accompanying drawing, I have shown in vertical, longitudinal section the apparatus for manufacturing the cork board.

The supporting frame consists of a pair of side frames quite similar in shape, one of them A at the side of the machine opposite the observer, being represented in the drawing. Two endless belts, the upper B and the lower C, are arranged to form the upper and lower walls of a gradually contracting passageway between the sides of the machine for the advance of the fibrous web and the granules of cork to be applied thereto. The upper belt B passes over guide rollers $b$, $b'$ and underneath compression rollers $b^2$, $b^3$ and $b^4$, the latter also forming a guide roller at one end of the belt. The lower belt C passes over guide rollers $c$, $c'$ and over the compression rollers $c^2$, $c^3$ and $c^4$, the compression rollers $c^2$ and $c^4$ forming at the same time guide rollers to determine the general direction of the belt. The upper guide belt is provided with an adjustable belt tightening roller D and the lower belt with a similar belt tightening roller D'. The guide roller $c$ for the lower belt is located at a suitable distance in a horizontal plane in advance of the roller $b$ a sufficient distance being left between the two for the introduction of the hopper for feeding the cork granules and for the introduction of the web of fibrous material.

The belts B and C are advanced by means of a drive pinion $e$ on the shaft E, driven by a pulley $e'$, connected by a belt $e^2$ with a smaller pulley $e^3$ on a shaft $e^4$, driven from a suitable source of power, not shown. The pinion $e$ gears with a larger gear wheel F fixed to rotate with the compression roller $c^2$ and a smaller gear wheel $f$, also fixed to rotate with the said roller $c^2$ is geared with a wheel G, fixed to rotate with the upper roller $b^2$. The wheel G is geared with a wheel $f'$, fixed to rotate with the lower roller $c^3$; the wheel $f'$ is geared with a wheel $g$, fixed to rotate with the outer roller $b^3$; the wheel $g$ is geared with a wheel $f^2$, fixed to rotate with the lower roller $c^4$; and the wheel $f^2$ is geared with a wheel $g'$, fixed to rotate with the upper roller $b^4$. The rollers $b^2$, $b^3$, $b^4$ and $c^2$, $c^3$, $c^4$ are so located with respect to one another that the distances between them shall gradually diminish. Thus for example, the distance between $b^2$ and $c^3$ is somewhat less than between $b^2$ and $c^2$; the distance between $c^3$ and $b^3$ is somewhat less than between $c^3$ and $b^2$; the distance between $c^4$ and $b^3$ is somewhat less than the distance between $c^3$ and $b^3$; and the distance between $c^4$ and $b^4$ is somewhat less than between $c^4$ and $b^3$. As a matter of economy in construction and in order that the travel of the curved surfaces of the several rollers may be synchronous while, at the same time, the curved surfaces of the rollers are arranged to approach each other, I gradually reduce the number of gear teeth on the drive wheel of each successive roller and at the same time reduce the circumference of the roller as compared with that of the preceding roller, thereby rendering it feasible to employ gears of ordinary pitch and length of teeth and at the same time accomplish the results sought. The contact of the rollers with the belts will carry the belts continuously forward between the rollers together with any material which may be inserted between the belts.

Over the belt C and in advance of the end of the upper belt B, I locate hoppers for the discharge of the granulated cork. In the present instance I have shown two hoppers for distributing different sized granules upon the lower belt and two corresponding hoppers for distributing different sized granules between the fibrous web and the upper belt. The two hoppers for distributing the coarser granules are denoted respectively by H and H', while the two hoppers for distributing the finer granules are denoted by $h$ and $h'$. These hoppers are made adjustable, in the present instance by means of elongated slots I and I', formed in plates secured to the outer sides of the hoppers $h, h'$ through which clamp screws $i$ and $i'$ extend into the side of the machine. The hoppers H and H' are made adjustable by means of similar slotted plates secured to their upper ends and provided with clamping screws. By means of these adjustments, the mouths of the hoppers may be moved nearer to or farther away from the surfaces on which the granules of cork are being distributed, so as to feed a lesser or greater quantity of granules, as may be desired.

Intermediate of the hoppers H, H' I lead the fibrous web K from a supply roll $k$, mounted in the upper portion of the frame, around a guide roller $k'$ in proximity to the mouths of the hoppers and into a position to feed the fibrous web along a horizontal plane about midway between the upper and lower endless belts B and C.

Soon after entering between the upper and lower endless belts, the granulated material and the treated web are brought under the influence of heating surfaces arranged in proximity to the belt as follows:—The lower heater L is fixed in position between the side frames with an upper flat face $l$ along which the lower belt travels and is provided with a chamber $l'$ for applying heat to the heater, conveniently in the form of steam. The upper heater M is pivoted at one end, as at $m$, to the side frames, with its lower flat surface $m'$ in proximity to the upper belt and its free end in position to press downwardly upon the belt and thereby crowd the material between the belts into a more compact form. The upper heater, like the lower, is provided with a chamber $m^2$ for receiving the heat imparting medium, such for example as steam. After leaving the final compression rollers $b^4$ and $c^4$, the pressed board is led between a pair of polishing or surfacing rollers N and N' geared together and one of them, N for example, provided with a pulley $n$, connected by a band $n'$ with the drive pulley on the shaft $e^4$, by which the said polishing or surfacing rollers are driven at a speed greater than that of the compression rollers.

In operation, the web of fibrous material having been inserted between the upper and lower belts and the hoppers provided with cork granulated to a fineness suitable for the purpose in hand and the belts started, the finer cork is first received from the hopper $h$ upon the upper surface of the lower belt and upon this the coarser granules from the hopper H fall, the two layers being carried along underneath and together with the fibrous web K and at the same time a layer of corresponding coarser granules from the hopper H' is being distributed upon the fibrous web and upon this layer a layer of finer granules from the hopper $h'$ is being deposited, the two layers being carried along between the fibrous web and the upper belt. As the several layers with the interposed fibrous material pass between the heaters, the adhesive material with which the fibrous web has been previously treated and which may be for example, a solution of amber, will become softened and will distribute itself under the pressure exerted, more or less throughout the interstices between the granules of cork. As the assembled material passes on between each two compression rollers, it becomes still further compressed until, when it finally emerges from the final compression rolls, it will have the nature of a tough, flexible, compact sheet and, after passing between the surfacing or polishing rollers, its surface will be smooth and hard.

It is obvious that the number of grades of granulated cork may be increased or diminished at pleasure by increasing or diminishing the number of hoppers for feeding the layers of cork and that the number of compression rolls may be regulated to suit the demands in any particular instance, the greater the number of compression rollers under ordinary circumstances the greater may be the speed at which the belts may be made to travel and hence the more rapidly the formation of the completed board.

What I claim is—

1. The method of manufacturing corkboard, consisting in feeding layers of granulated cork between continuously moving walls of a conduit and simultaneously therewith interposing a web of fibrous material between the walls of the conduit in engagement with the granulated cork and compressing the layers of cork and the web.

2. The method of manufacturing corkboard, consisting in feeding layers of granulated cork between continuously moving walls of a conduit and simultaneously therewith interposing a web of fibrous material between the walls of the conduit in engagement with the granulated cork and gradually compressing the layers of cork and the web.

3. The method of manufacturing corkboard, consisting in feeding layers of granulated cork between continuously moving walls of a conduit, interposing a treated web of fibrous material between the layers, heating the treated web while in contact with the layers of cork, and compressing the layers of cork and web while cooling.

4. Apparatus for manufacturing corkboard, comprising endless belts arranged to form a conduit between their adjacent faces, means for driving the belts, compression rollers located upon opposite sides of the adjacent parts of the belts, feed hoppers in position to distribute granulated cork between the belts and a guide for directing the web of fibrous material between the belts in contact with the layers of cork, substantially as set forth.

5. Apparatus for manufacturing cork-board, comprising endless belts arranged to form a conduit between their adjacent faces, means for driving the belts, compression rollers located upon opposite sides of the adjacent parts of the belts, adjustable feed hoppers in position to distribute granulated cork between the belts, a guide for directing a web of fibrous material between the belts in contact with the layers of cork and surfacing rollers for receiving the compressed board from the belts, substantially as set forth.

THEODORE A. WEBER.

Witnesses:
FREDK. HAYNES,
IRENE B. DECKER.